Feb. 13, 1962
R. S. GRESKO
3,021,177
DUMP BODY CONTROL SYSTEM
Filed March 8, 1960
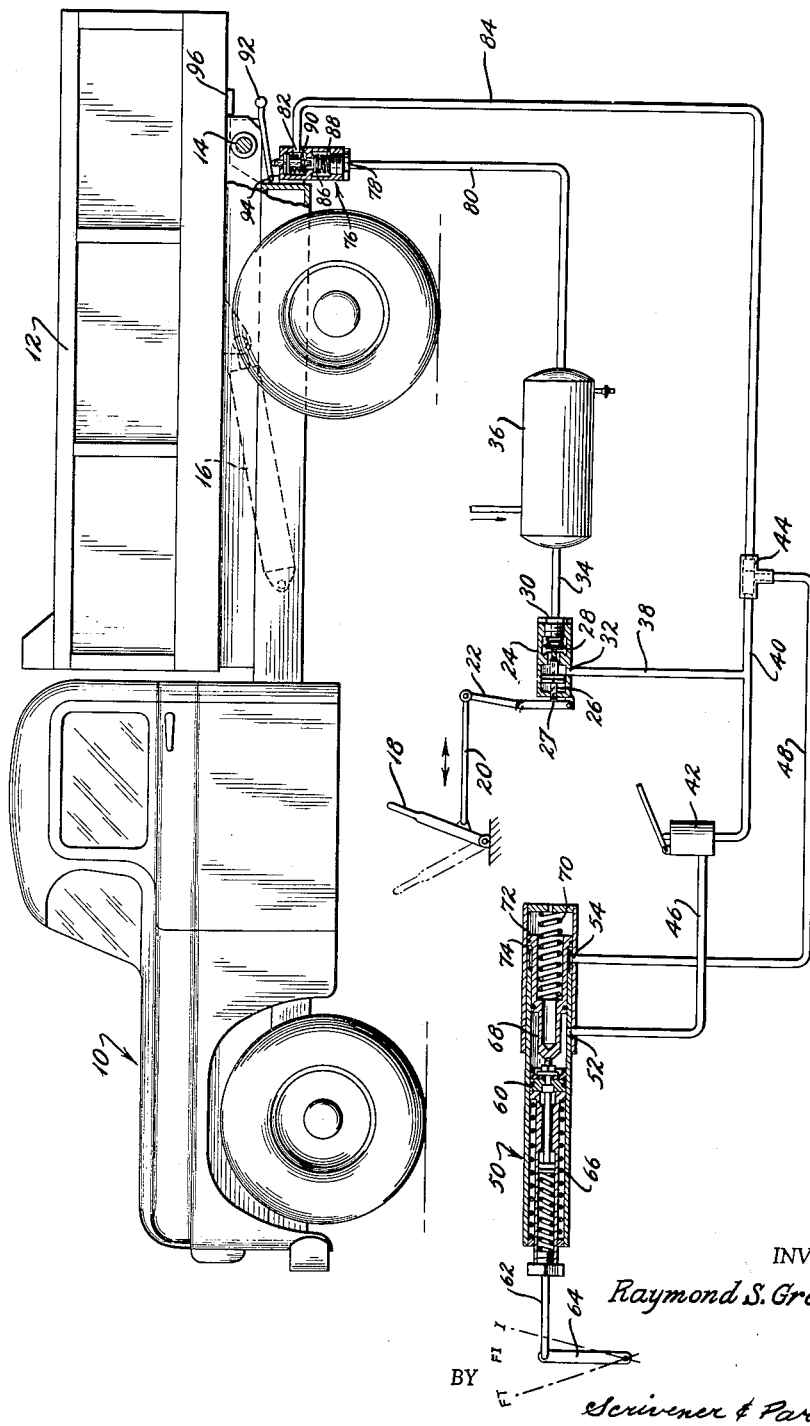
INVENTOR
*Raymond S. Gresko*
BY
*Scrivener & Parker*
ATTORNEYS United States Patent Office 3,021,177
Patented Feb. 13, 1962

3,021,177
DUMP BODY CONTROL SYSTEM
Raymond S. Gresko, Elyria, Ohio, assignor to Bendix-Westinghouse Automotive Air Brake Company, Elyria, Ohio, a corporation of Delaware
Filed Mar. 8, 1960, Ser. No. 13,466
3 Claims. (Cl. 298—21)

This invention relates to automotive dump trucks and, more particularly, to a system for automatically controlling movement of a dump body during a dumping operation.

Dump trucks which are equipped with fluid pressure braking systems frequently employ the pressurized fluid for operating a variety of accessory equipment in addition to operating the brakes, one such accessory being a pressure operated throttle which, upon manpulation of a foot operated throttle valve, effects changes in engine speed through the medium of a fluid pressure-responsive piston of well known construction. The present invention is concerned with throttle systems of this general nature and it is broadly an object of the invention to provide an automatic control for the throttle system where it is employed on a dump truck and the dump body is moved to dumping position by hydraulic or other means selectively connectable to the truck engine through a conventional power take-off mechanism.

Heretofore systems of the foregoing nature have been arranged to permit the truck operator to control the speed with which the body is raised in a dumping direction and frequently the operator, by merely pressing down on the throttle valve, causes the dump body to be raised at an excessive speed until it reaches its maximum height and is suddenly stopped. This sudden stopping of large masses causes expensive deterioration and early breakdown of the equipment. It is an object of the invention to eliminate such early breakdown by providing in the described system means whereby, when the power take-off is engaged for dumping, control of engine speed is taken away from the operator and it is thereafter automatically controlled with the operator having only the control of engagement and disengagement of the power take-off.

More specifically, it is an object of the invention to provide a system of the foregoing nature wherein when the power take-off is engaged for dumping, the throttle valve is de-activitated and the engine is set at a predetermined speed for raising the dump body at a predetermined rate with means being provided to automatically decrease engine speed as the dump body approaches its maximum height.

Other objects and their attendant advantages will become apparent as the following detailed description is read in conjunction with the single figure which illustrates a conventional dump truck employing a schematically shown air throttle system arranged in accordance with the invention.

Referring now to the drawing, the numeral 10 designates a conventional dump truck having a dump body 12 which is mounted for dumping on trunnions 14 with the body 12 being movable to dumping position by means of a conventional hydraulic cylinder 16 actuated in a well known manner through a power take-off (not shown) which is connectible to the truck motor by means of a conventional power take-off lever 18 which is movable from the disengaged position shown in solid lines to the engaged position shown in dotted lines.

In accordance with the invention the lever has connected thereto one end of a link 20 whose opposite end is connected to an arm 22 pivotally connected to a valve body 24 containing a two-way valve mechanism including an exhaust plunger 26 engageable by the arm 22 and an inlet valve 28 spring-urged to a position disconnecting valve inlet and outlet ports 30, 32. The inlet port 30 is connected by way of a conduit 34 with a fluid pressure reservoir 36, which may be the main reservoir for the braking system, which is charged with pressure from a source (not shown) in the vehicle, and the outlet port 32 of the valve 24 is connected by way of a conduit 38 to a conduit 40 which leads forwardly to a conventional pedal-operated throttle valve 42 and rearwardly to a double check valve 44. The throttle and check valves 42, 44 are respectively connected by way of conduits 46, 48 with a throttle control cylinder 50 of known construction. The cylinder 50 has a throttle port 52 in the side thereof which is connected by way of conduit 46 to the throttle valve 42. The cylinder 50 has also in the side thereof an idle port 54 which is connected by way of conduit 48 with the double check valve 44. Contained within the cylinder 50 is a throttle piston 60 which is connected by way of a plunger 62 with the engine throttle control lever 64 which may be moved counter clockwise from the position shown to increase engine speed. The piston 60 is urged to the right in the drawing by a spring 66 but is normally prevented from moving to the right by a plunger 86 which abuts the piston 60 and is normally retained in the position of the drawing by means of a spring 70, of greater strength than spring 66, with movement to the left of plunger 68 being limited by engagement of an idle piston 72 with stop means 74 in the cylinder as shown.

When pressure is admitted beneath the piston 72 by way of conduit 48 and idle port 54, the piston is moved to the right permitting spring 66 to expand and move piston 60 and hence plunger 62 and throttle lever 64 to the right thereby decreasing the speed of the engine. When lever 64 is in the dotted line position marked "I" the engine speed is slowed to its normal idle speed and when the lever 64 is in the solid line position marked "FI" the engine speed is set at a normal fast idle and when the lever 64 is moved all the way to the left to the dotted line position marked "FT" the engine speed is at its maximum full throttle.

Where a vehicle employs a fluid pressure system for brakes and the like, it is desirable when initially there is no pressure in the reservoir that the engine be operated at a relatively fast idling speed in order to warm up the engine and also to operate the compressor at a speed which will fill the reservoir in a relatively short time. The throttle cylinder 50 is specifically designed to retain the throttle lever 64 in an intermediate fast idle position, which is its position in the drawing, until sufficient pressure has built up in the reservoir 36 to cause the idle piston 72 to move to the right in the drawing and thus move the throttle lever 64 to its normal idle position.

In accordance with the invention, the throttle piston 50 is not only used for the described normal control of the engine, but it is also used to control engine speed when the engine is used for raising the dmup body 12. Automatic dumping speed of the engine is controlled by the power take-off lever 18 which, when it is moved to the dotted line engaged position causes the inlet valve member 28 of valve 24 to move to its closed position while simultaneously connecting conduits 38, 40, leading to throttle valve 42, to atmosphere through the exhaust passage 27 in the plunger 26. Upon this occurrence fluid pressure which has been admitted to the idle port 54 of cylinder 50 by way of check valve 44 and conduit 48 is also connected to atmosphere so that the piston 72 is moved to the left under the influence of spring 70 to the position of the drawing thereby placing the throttle lever 64 in the intermediate fast idle position shown. Because fluid pressure is no longer supplied to the throttle valve 42, due to the closing of the inlet valve 28, the operator is unable to control the delivery of pressure to the throttle port 52 to control the speed of the engine and thus the dump body is raised at a speed determined by the fast idle setting.

In order that the dump body will not be stopped at its maximum height while travelling at the relatively fast speed afforded by the fast idle setting of the throttle, the invention provides means for supplying fluid pressure to the idle port 54 as the dump body approaches the top of its dump movement. The means for automatically accomplishing the foregoing comprises a two-way valve 76 which may be substantially identical to the valve 24 and includes an inlet port 78 which is connected to the reservoir 36 by way of a conduit 80 and an outlet port 82 which is connected to the two-way check valve 44 by way of a conduit 84. The valve 76 contains an inlet valve 86 which is normally retained in closed position by a spring 88 and is moved to open position upon depression of an exhaust plunger 90 whose outer end engages a lever 92 which is pivoted at 94 as shown and is engageable by a pad 96 on the dump body when the latter has substantially reached its maximum dump elevation. As the body 12 continues to rise the lever 92 is pushed downwardly in a clockwise direction causing plunger 90 to move against valve 86 opening this and simultaneously closing off the exhaust passage in the plunger. As soon as valve 86 is open, ports 78, 82 are connected so that fluid pressure may now flow by way of conduit 84 to double check valve 44 causing the latter to be shifted to its left hand position to disconnect conduits 40 and 48 while connecting the latter to conduit 84 whereby fluid pressure flows to the idle port 54 of cylinder 50 causing idle piston 72 to move to the right and plunger 62 and throttle lever 64 to move to the normal idle position. When the lever 64 has been thus moved to the idle position, the operator knows that the dump body has moved to its maximum elevation and he thereupon moves the power take-off lever to the disengaged position thereby opening valve 24 and restoring fluid pressure to the throttle valve 42 so that the operator may again have normal control of the engine. After the lever 18 has been moved to the disengaged position, regardless of whether the body 12 is immediately lowered or retained in its raised position, fluid pressure will be supplied to the idle port, 54, of the cylinder 50 through either the left or right hand side of the check valve 44 depending upon the position of the truck body. Thus it will be seen, the automatic control features of the invention do not in any way effect the normal operation of the throttle system after the power take-off lever has been moved to its disengaged position.

It is believed that from the foregoing description no further description of the operation of the system of the invention is required. It will be readily apparent to those skilled in the art that the system shown and described is susceptible of a variety of changes and modifications without, however, departing from the scope and spirit of the appended claims.

What is claimed is:

1. In combination with a dump truck having a throttle controlled engine and a dump body raisable to dumping position, a manually movable power take-off lever for engaging and disengaging dump mechanism with the truck engine, and a fluid pressure operated throttle system including a serially connected throttle cylinder having throttle and idle ports and a pressure responsive part connected to the engine throttle and movable between idle, fast idle, and full throttle positions, a pedal-operated throttle valve and a source of fluid pressure, said throttle valve being connected between said throttle port and said source of fluid pressure, a fluid connection between said source and said idle port, resilient means normally retaining said pressure responsive part in its fast idle position, said part being movable against said resilient means to its idle position when a predetermined pressure is admitted to said idle port, two-way valve means normally connecting said pressure source with said throttle valve and said idle port and being movable to a second position disconnecting said source from said throttle valve and said idle port while connecting the latter to atmosphere, means responsive to movement of said power take-off lever to engaging position for moving said valve means to its second position, thereby deactivating said throttle valve and effecting movement of said pressure-responsive part of said throttle cylinder to fast-idling position, a second fluid connection between said fluid pressure source and the first connection thereof with said idling port, a double-check valve at the juncture of said connections, said check valve being constructed and arranged that when pressure exists in said first connection but not in the second, said valve opens said first and closes said second connection between said source and said idling port and vice versa, a normally closed two-way valve in said second connection between said check valve and said source and normally blocking the flow of fluid pressure through said connection to said check valve while simultaneously connecting the former to atmosphere, and means responsive to movement of said dump body to its fully raised position for moving said last named valve to open position to close off said atmospheric connection and simultaneously to connect said check valve and hence said idle port with said source of fluid pressure.

2. In combination with an engine operated dump body including raising mechanism and a power take-off lever movable between positions for operatively connecting and disconnecting said raising mechanism with said engine, fluid pressure operated means for controlling the speed of said engine including a pressure source and a manually operable throttle valve, two-way valve means normally connecting said throttle valve and said source and being responsive to movement of said power take-off lever to its connecting position for disconnecting said throttle valve and said source while simultaneously effecting operation of said fluid pressure operated speed control means to cause said engine to operate at a predetermined rate of speed for raising said dump body, and means responsive to the movement of said dump body to its fully raised position for effecting operation of said fluid pressure operated speed control means to cause said engine to operate at a second predetermined rate of speed less than the first predetermined rate.

3. In combination with an engine-operated dump truck having raising mechanism, a dump body and a power-take-off lever movable between positions for operatively connecting and disconnecting said raising mechanism with said engine, fluid pressure operated means for controlling the speed of said engine including a source of fluid pressure, a throttle valve, and a throttle piston connected to the engine and resiliently urged to a position causing said engine to operate at idle speed, spring means normally retaining said piston in a position causing said engine to operate at a fast-idle speed, fluid pressure responsive means for overcoming the force of said spring means when the pressure at said source is at a predetermined level to enable said piston to move to its idle position, normally open valve means between said source and said piston and being responsive to movement of said power take-off lever to its engaged position for disconnecting said source from said throttle piston and said pressure responsive means to cause said piston to occupy a fast-idle position solely under the influence of said spring means, and second normally closed valve means responsive to movement of said dump body to its fully raised position for connecting said source to said fluid pressure responsive means to allow said piston to move to its idle position.

References Cited in the file of this patent

UNITED STATES PATENTS 2,690,712  Foote _____ Oct. 5, 1954